(12) United States Patent
Portilla

(10) Patent No.: US 7,877,451 B2
(45) Date of Patent: Jan. 25, 2011

(54) SYSTEM, METHOD AND PROGRAM PRODUCT FOR DISTRIBUTION OF CONTENT CONTAINED IN AN ELECTRONIC MAIL MESSAGE

(75) Inventor: Jesus Ivan Portilla, Erie, CO (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 12/324,282

(22) Filed: Nov. 26, 2008

(65) Prior Publication Data

US 2010/0131604 A1    May 27, 2010

(51) Int. Cl.
*G06F 15/16* (2006.01)
(52) U.S. Cl. .................. 709/206; 709/205; 709/217; 709/219
(58) Field of Classification Search .......... 709/205, 709/206, 217, 218, 225
See application file for complete search history.

(56) References Cited

U.S. PATENT DOCUMENTS

| | | | | |
|---|---|---|---|---|
| 5,781,809 A | * | 7/1998 | Suzuki et al. | 396/134 |
| 5,903,723 A | * | 5/1999 | Beck et al. | 709/205 |
| 6,275,848 B1 | * | 8/2001 | Arnold | 709/206 |
| 7,039,678 B1 | * | 5/2006 | Halahmi et al. | 709/206 |
| 7,054,905 B1 | * | 5/2006 | Hanna et al. | 709/206 |
| 2004/0024826 A1 | * | 2/2004 | Halahmi et al. | 709/206 |
| 2006/0242663 A1 | * | 10/2006 | Gogerty | 725/34 |
| 2008/0170674 A1 | * | 7/2008 | Ozden et al. | 379/93.24 |
| 2008/0306972 A1 | * | 12/2008 | Wilkin et al. | 709/206 |

* cited by examiner

*Primary Examiner*—Ramy M Osman
(74) *Attorney, Agent, or Firm*—Arthur J. Samodovitz; Silvy Anna Murphy

(57) ABSTRACT

A system, method and program product for sharing content contained in an e-mail. The method includes determining, using a tool, presence of any file attachments in an e-mail created in an e-mail application, removing, responsive to the determination, any file attachments from the e-mail prior to queuing the e-mail message for delivery, posting, using the tool, the e-mail as a feed document on a feed server on a network, publishing, using the tool, any file attachments removed from the e-mail on a network drive on the network, and sending, using the tool, respective links to the feed document posted and any file attachments published on the network to one or more recipients specified for the e-mail, wherein the respective links notify the one or more recipients of the e-mail and any file attachments. Further, the e-mail application includes a tagging tool for creating tags for the e-mail.

15 Claims, 14 Drawing Sheets

SYSTEM, METHOD AND PROGRAM PRODUCT FOR DISTRIBUTION OF CONTENT CONTAINED IN AN ELECTRONIC MAIL MESSAGE

FIELD OF THE INVENTION

The present invention relates to computer systems and software, and more specifically to a technique for distribution of content, such as, an electronic mail (e-mail) message and/or one or more file attachments contained in an e-mail message to others on a computer network.

BACKGROUND OF THE INVENTION

Current e-mail clients have not changed much since the Web 1.0 technologies were created. Users complain of garbled e-mails and/or too much unsolicited or spam e-mails. Further, Internet Service Providers (ISPs) are inundated with downloading bloated e-mails with very large file attachments. As such, there is a need to examine the efficiency and effectiveness of e-mail communication systems employed as far as the resources consumed, such as, storage and/or memory required as well as time spent by users in sending, receiving and/or responding to such communications.

SUMMARY OF THE INVENTION

The present invention resides in a system, method and program product for distributing or sharing content contained in an e-mail message, in accordance with an embodiment of the invention. The method includes determining, using a tool, presence of any file attachments in an e-mail created in an e-mail application, removing, responsive to the determination, any file attachments from the e-mail prior to queuing the e-mail message for delivery, posting, using the tool, the e-mail as a feed document on a feed server on a network, publishing, using the tool, any file attachments removed from the e-mail on a network drive on the network, and sending, using the tool, respective links to the feed document posted and any file attachments published on the network to one or more recipients specified for the e-mail, wherein the respective links notify the one or more recipients of the e-mail and any file attachments. Further, the e-mail application includes a tagging tool for creating tags for the e-mail. In an embodiment, the tool includes a list for controlling access to any file attachments published on the network. In an embodiment, the publishing step further includes encrypting and compressing any file attachments before publishing any file attachments on the network drive. In an embodiment, the e-mail application is a web 2.0 e-mail application.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
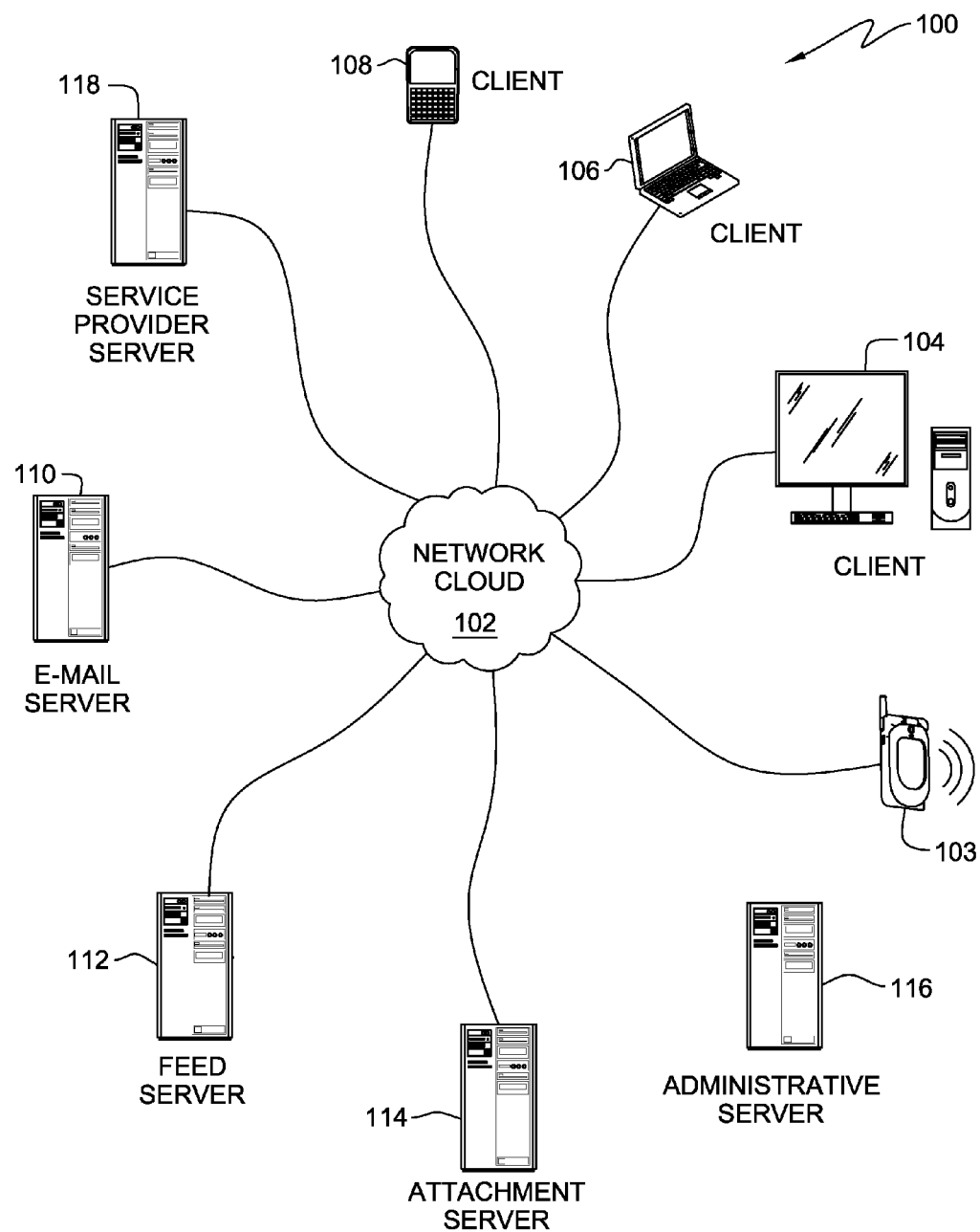
FIG. 1 is a schematic block diagram illustrating one embodiment of cloud computing, where a network of clients and servers are connected to a network cloud for distributing or publishing content contained in an e-mail message, including any file attachments intended for one or more recipients, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 2:
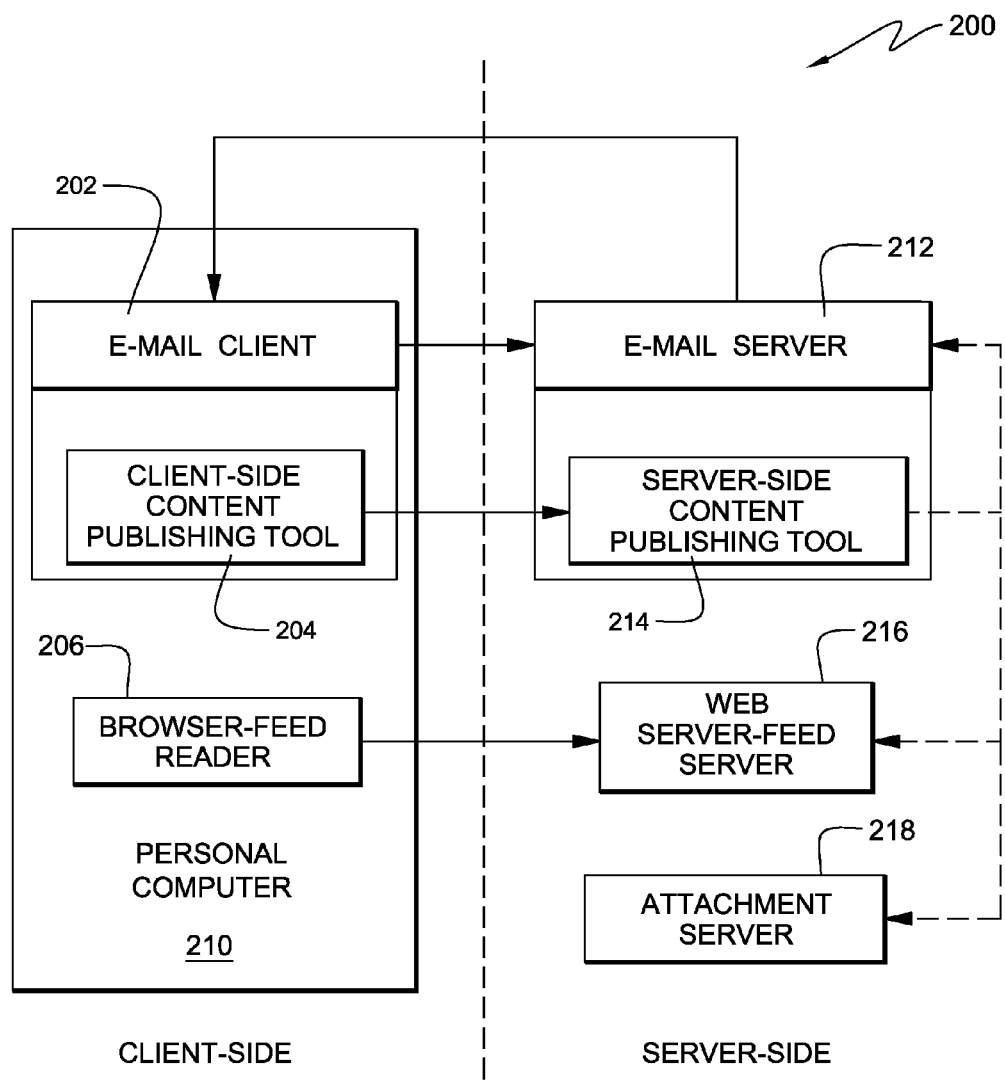
FIG. 2 depicts an embodiment of a client-server infrastructure for distributing or publishing content contained in an e-mail message, including any file attachments intended for one or more recipients, in accordance with an embodiment of the present invention.

In one embodiment, the invention provides a system for distributing or sharing of content, such as, an electronic mail (e-mail) message and/or one or more file attachments contained in an e-mail message to others on a computer network, in accordance with an embodiment of the invention. Reference is now made to FIGS. 1 and 2, which illustrate embodiments of the invention. Turning to FIG. 1, reference numeral 100, schematically illustrates an embodiment of a cloud computing infrastructure for distributing or sharing of content. The computer infrastructure includes one or more clients 103, 104, 106 and 108 and one or more servers 110, 112, 114, 116 and 118 connected to each other via a network 102. In an embodiment, each of the clients 103 (cell phone), 104 (desktop), 106 (laptop) and 108 (Blackberry® device or PDA) has deployed thereon a client-side content publishing tool and a tagging tool for distributing or sharing content, as explained herein below. Further, each of the servers 110, 112, 114, 116 and 118 has deployed thereon a server-side content publishing tool for distributing or sharing content, as explained herein below. In an embodiment, one of the servers 110 is an e-mail server, another server 112 is a web server or a feed server and yet another server 114 is an attachment server or a network server, as explained further herein below. Further, in an embodiment, one of the servers 116 is an administrative server that controls and configures access to the network of clients and servers connected to the network 102. Furthermore, in an embodiment, a server 118 is a service provider server that provides a content publishing or distributing service to the other clients and servers connected to the network 102, as discussed herein below with respect to FIG. 12. It will be understood by one skilled in the art that additional clients, servers and other devices or components may be included in the computer infrastructure 100.

Turning to FIG. 2, reference numeral 200, illustrates a computer system that includes a client-side system and a server-side system. The client-side system comprises a client computer, for instance, a personal computer 210, whereas, the server-side system includes one or more servers, as discussed herein below. Although, the discussion describes the invention in terms of a personal computer, it will be understood by one skilled in the art that the client may be any device, such as, a handheld device, a smart phone, a laptop or similar device that has deployed thereon an electronic mail (e-mail) client application software. The personal computer 210 has deployed or installed thereon an e-mail client application software 202, which enables a user using the personal computer 210 to create, send and receive e-mails. Further, in an embodiment, the e-mail client application 202 includes a client-side content publishing tool 204 for distributing or sharing with others content, such as, an electronic mail (e-mail) message and/or one or more file attachments attached to an e-mail message created by a user. The personal computer further includes a browser or feed reader program or software 206, which enables a user to subscribe to and view or access one or more feeds or feed documents, as described further herein below with respect to FIGS. 3 and 8. On the server-side, the computer system 200 includes an e-mail server application or program 212, running on a server connected to a network, for sending and/or receiving e-mail messages through e-mail programs or applications loaded on client computers. In an embodiment, the e-mail server 212 includes a server-side content publishing tool 214 for receiving e-mail messages to be distributed among one or more clients, in accordance with the invention, as explained further herein below with respect to FIGS. 4 and 9. Further, the server-side includes a web server and/or feed server 216 for posting the e-mail message as a link, as described further herein below with respect to FIGS. 5 and 10. Moreover, the server-side includes an attachment server 218 for publishing any file attachments as links, as explained further herein below with respect to FIGS. 6 and 11.

Figure 3:
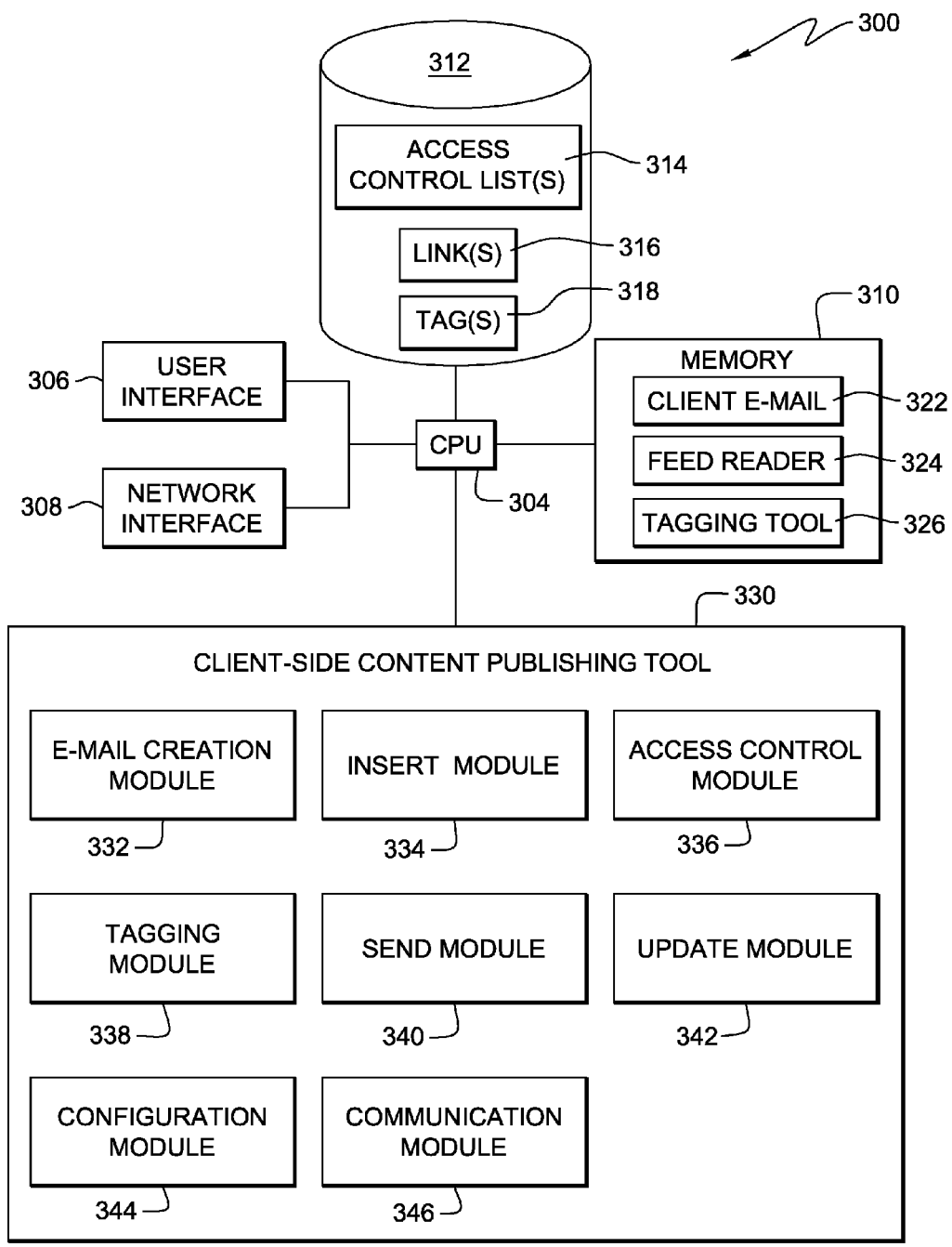
FIG. 3 depicts an embodiment of an e-mail client computer system having deployed thereon a content distribution tool for distributing or publishing content contained in an e-mail message, including any file attachments intended for one or more recipients, in accordance with an embodiment of the present invention.

Reference is now made to FIG. 3, reference numeral 300, which depicts an embodiment of a client computer system having deployed thereon a computer program product, namely, a content publishing tool for sharing or publishing content contained in the e-mail, in accordance with an embodiment of the present invention. In an embodiment, the content publishing tool or program 330 is run within the client computer system 300. Preferably, the client computer system 300 is a computer system that includes a central processing unit (CPU) 304, a local storage device 302, a user interface 306, a network interface 308, and a memory 310. The CPU 304 executes operations within the client system 300. The user interface 306, in one embodiment, allows a user or operator to interact with the computer system 300, including allowing input of commands and/or data for generating an e-mail message using the e-mail application 322 installed on the computer system 300. The network interface 308, in one embodiment, facilitates network communications of the client computer system 300 over a communications channel of a network, such as the network 102, shown in FIG. 1. In an embodiment, the memory 310 stores one or more applications or programs, such as, an e-mail application 322, a feed reader 324 and a tagging or bookmarking tool 326. In an embodiment, the feed reader is an RSS (Really Simple Syndication) reader reads content of feeds or feed files. In one embodiment, as shown in FIG. 3, the content publishing tool or program 330 which runs on the client computer system 300 comprises a logic unit that contains a plurality of modules that functionally execute the necessary steps of creating an e-mail message and for detaching any attachments from the e-mail message before posting the e-mail message as a feed on a feed server, as explained herein below with respect to FIG. 4. In an embodiment, shown in FIG. 3, the content publishing tool or program 330 running on the client computer system 300 includes an e-mail creation module 332, an insert module 334, an access control module 336, a tagging module 338, a send module 340, an update 342, a configuration module 344 and a communication module 346. In an embodiment, the e-mail creation module 332 creates an e-mail message on the computer system 300, which e-mail message is addressed to one or more recipients. The insert module 334 attaches one or more file attachments to the e-mail message created for sending to the one or more recipients identified or addressed in the e-mail. The access control module 336 creates access control lists 314 for controlling access to the e-mail message and/or file attachments by each of the recipients identified in the e-mail. For instance, a recipient may be given only viewing or reading privileges, such that, the recipient may not edit the e-mail message and/or any file attachments. Similarly, a recipient may be given editing privileges, such that, the recipient may edit the e-mail message and/or any file attachments. Moreover, a recipient may be given administrative privileges, such that, the recipient may not only edit the e-mail message and/or any file attachments, but may delete the e-mail message and/or any file attachments. In an embodiment, one or more access control list(s) 314 generated by a user are stored in a local storage 312 within the client computer system 300. Further, the tagging module 338 enables a user to create or generate a tag or keyword for bookmarking the e-mail message that is created, utilizing the tagging tool 326. In an embodiment, one or more tag(s) or keywords 318 are stored in a local storage 312 within the client computer system 300. The send module 340 queues the e-mail message created for sending to an e-mail server for delivery of the e-mail message to one or more recipients identified in the e-mail. Further, the send module 340 encrypts and/or compresses the e-mail message and/or any file attachments inserted before sending the e-mail message. An update module 342 receives updates regarding feeds or links pertaining to the e-mail message sent, as explained herein below with respect to FIG. 4. In an embodiment, the configuration module 344 sets an expiration date for the e-mail message and/or any file attachments inserted in the e-mail. Further, the configuration module 344 specifies delivery dates for delivering the e-mail message created by a sender, such that, the e-mail message is only delivered on the specified date. The communication module 344 permits communication between the various modules of the client content publishing tool 330, memory 310, local storage 302 and with external computer systems, such as, an e-mail server, which is connected to the client computer system over a network.

Figure 4:
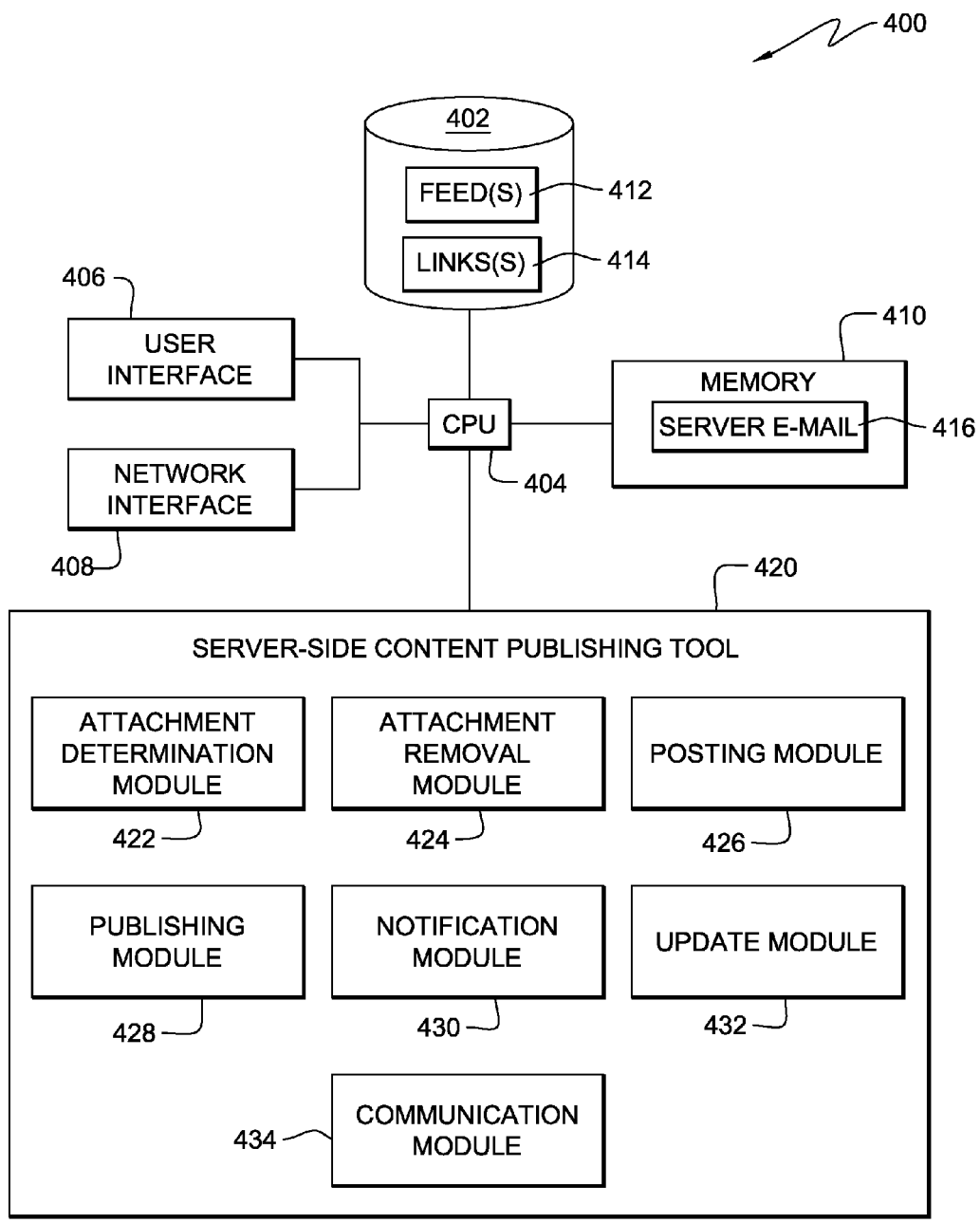
FIG. 4 depicts an embodiment of an e-mail server computer system having deployed thereon a content distribution tool for distributing or publishing content contained in an e-mail message, including any file attachments intended for one or more recipients, in accordance with an embodiment of the present invention.

Reference is now made to FIG. 4, reference numeral 400, which depicts an embodiment of a server computer system or server having deployed thereon a computer program product, namely, a server-side content publishing tool for distributing or sharing content sent in an e-mail message created by a user, in accordance with an embodiment of the present invention. In an embodiment, the server-side content publishing tool or program 420 is run within the computer system or server 400. Preferably, the computer system 400 is a computer system or server that includes a central processing unit (CPU) 404, a storage device 402, a user interface 406, a network interface 408, and a memory 410. The CPU 404 generally executes operations within the e-mail system or server 400. The user interface 406, in one embodiment, allows a user or operator to interact with the e-mail server 400, including allowing input of commands and/or data for distributing or sharing content sent in an e-mail message. The network interface 408, in one embodiment, facilitates network communications of the system or server 400 over a communications channel of a network, such as the network 102, shown in FIG. 1. In an embodiment, the memory 410 stores one or more applications or programs 412, such as, the server e-mail application or program 416. In one embodiment, as shown in FIG. 4, the server-side content publishing program or tool 420 which runs on the e-mail server or system 400 comprises a logic unit that contains a plurality of modules that functionally executes the necessary steps of distributing or sharing content sent in an e-mail message created by a user and received by the server 400. In an embodiment, shown in FIG. 4, the server-side content publishing tool or program 420 running on the e-mail server 400 includes an attachment determination module 422, an attachment removal module 424, a posting module 426, a publishing module 428, a notification module 430, an update module 432 and a communication module 434. In an embodiment, the attachment determination module 422 determines whether or not there are any file attachments in the e-mail message received from the e-mail client. The attachment removal module 424 removes any file attachments that are determined to be attached in the e-mail message. Further, the posting module 426 posts the e-mail message with the file attachments removed as a feed. In an embodiment, the feed is posted on a feed server connected to a network, as shown in FIG. 1. In an embodiment, the feed(s) 412 generated by the posting module 426 are stored in a local storage 402 within the server computer system 400. The publishing module 428 publishes the file attachments removed from the e-mail message on an attachment server or a network drive. The notification module 430 sends a link to the feed as well as the file attachments published to the e-mail creator. Further, the notification module 430 sends a link to the feed as well as the file attachments published to any recipients addressed in the e-mail. Moreover, the update module 432 sends updates for links to the file attachments as well as the feeds posted for the text of the e-mail messages to the sender or creator of the e-mail as well as to an intended recipient to whom the e-mail message was addressed. In an embodiment, the link(s) 414 generated by the publishing module 428 are stored in a local storage 402 within the server computer system 400. Further, the update module 432 updates the feeds and the links stored in local storage 402. The communication module 434 permits communication between the various modules of the server-side content publishing tool 420, memory 410, local storage 402 and with external computer systems, such as, the e-mail client computer system 300 (shown in FIG. 3) and a feed server, which is also connected to a network that can be accessed by the server computer system 400.

Figure 5:
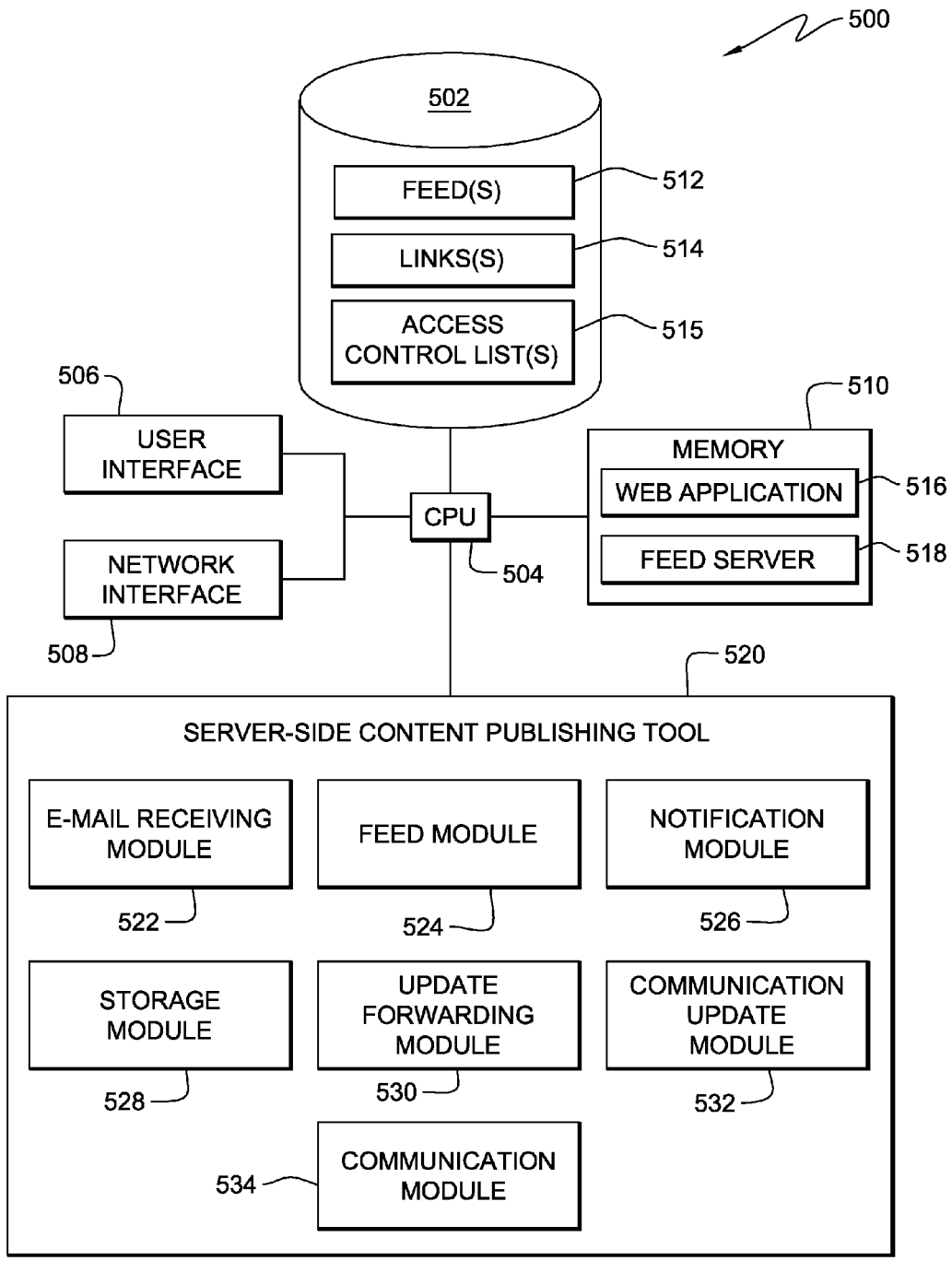
FIG. 5 depicts an embodiment of a web server or a feed server computer system having deployed thereon a content distribution tool for distributing or publishing content contained in an e-mail message, including any file attachments intended for one or more recipients, in accordance with an embodiment of the present invention.

Reference is now made to FIG. 5, reference numeral 500, which depicts an embodiment of a server computer system or server having deployed thereon a computer program product, namely, a server-side content publishing tool for distributing or sharing content sent in an e-mail message created by a user, in accordance with an embodiment of the present invention. In an embodiment, the server-side content publishing tool or program 520 is run within the computer system or server 500. Preferably, the computer system 500 is a web server or a feed server computer system that includes a central processing unit (CPU) 504, a storage device 502, a user interface 506, a network interface 508, and a memory 510. The CPU 504 executes operations within the e-mail system or server 500. The user interface 506, in one embodiment, allows a user or operator to interact with the e-mail server 500, including allowing input of commands and/or data for distributing or sharing content sent in an e-mail message. The network interface 508, in one embodiment, facilitates network communications of the system or server 500 over a communications channel of a network, such as the network 102, shown in FIG. 1. In an embodiment, the memory 510 stores one or more applications or programs 512, such as, a web server application or program 516 and the feed server application 518. It will be understood by one skilled in the art that the feed server application may be a component or tool included within the web application and not a separate application component as shown in FIG. 5. In one embodiment, as shown in FIG. 5, the server-side content publishing program or tool 520 which runs on the web or feed server 500 comprises a logic unit that contains a plurality of modules that functionally execute the necessary steps of distributing or sharing content sent in an e-mail message. In an embodiment, shown in FIG. 5, the server-side content publishing tool or program 520 running on the e-mail server 500 includes an e-mail receiving module 522, a feed module 524, a link module 526, a storage module 528, an update module 530 and a communication module 532. The e-mail receiving module 524 receives the body of the e-mail message created by an e-mail sender and forwarded by the e-mail server 400, but without any file attachments that are removed by the e-mail server 400 from the e-mail message forwarded to the web or feed server 500. In an embodiment, the feed module 524 posts the e-mail message as a feed or feed document on the web server 500. Further, the notification module 526 sends a link to the e-mail message posted as a feed on the web or feed server 500 to the e-mail server 400. The storage module 528 stores the feed(s) 512 generated by the feed module 524 in a local storage 502 within the web server or feed server computer system 500. Moreover, the update module 530 provides updates for the links to the feeds posted on the web or feed server to the e-mail server 400. The communication module 532 permits communication between the various modules of the server-side content publishing tool 520, memory 510, local storage 502 and with external computer systems, such as, the e-mail server computer system 400 (shown in FIG. 4), which is connected to a network as discussed herein above with respect to FIG. 1.

Figure 6:
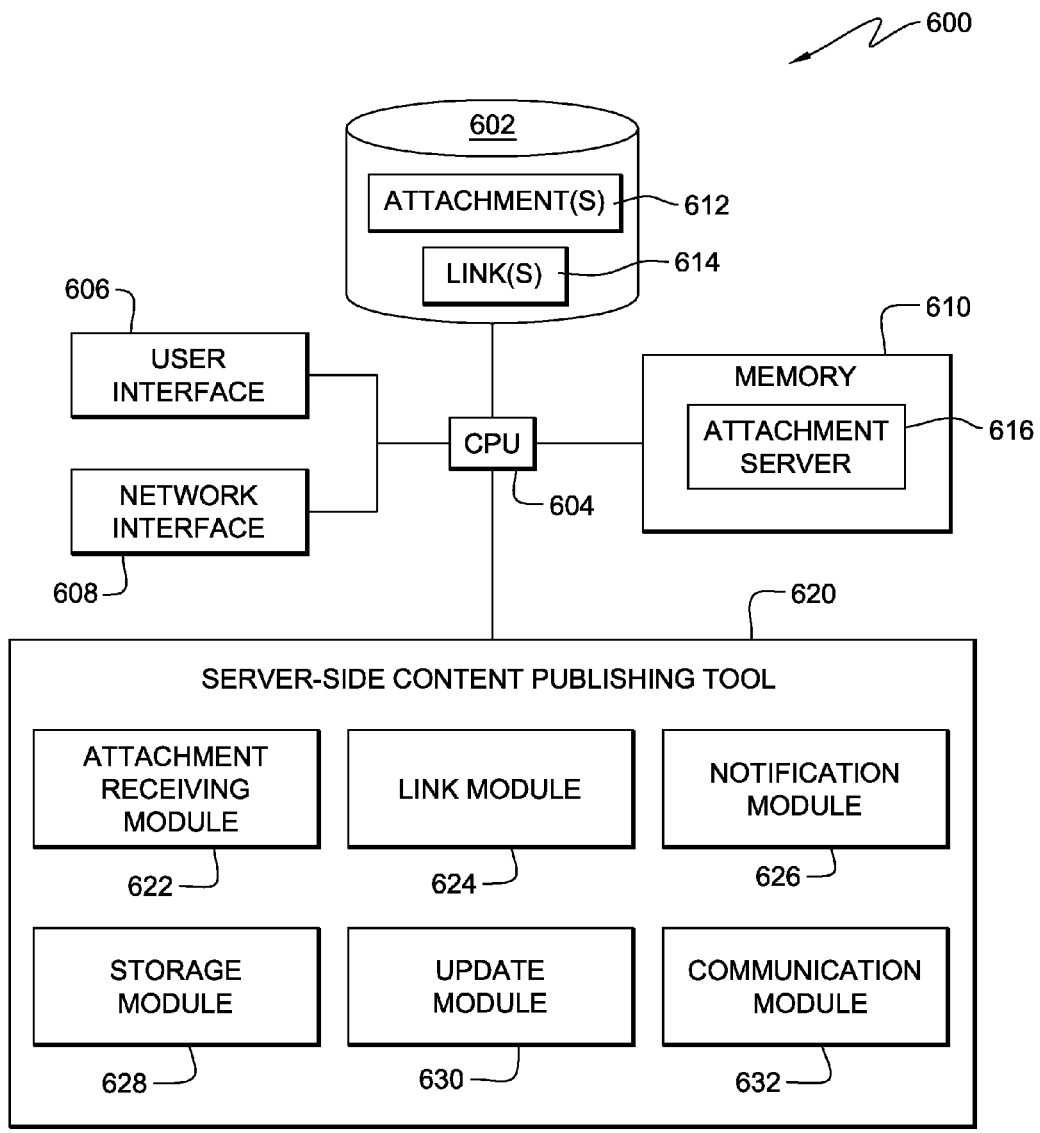
FIG. 6 depicts an embodiment of an attachment server or a network server computer system having deployed thereon a content distribution tool for distributing or publishing content contained in an e-mail message, including any file attachments intended for one or more recipients, in accordance with an embodiment of the present invention.

Reference is now made to FIG. 6, reference numeral 600, which depicts an embodiment of a server computer system or server having deployed thereon a computer program product, namely, a server-side content publishing tool for distributing or sharing content sent in an e-mail message created by a user, in accordance with an embodiment of the present invention. In an embodiment, the server-side content publishing tool or program 620 is run within the computer system or server 600. Preferably, the computer system 600 is an attachment server or a network server that includes a central processing unit (CPU) 604, a storage device 602, a user interface 606, a network interface 608, and a memory 610. The CPU 604 executes operations within the network or attachment server 600. The user interface 606, in one embodiment, allows a user or operator to interact with the e-mail server 600, including allowing input of commands and/or data for distributing or sharing content sent in an e-mail message. The network interface 608, in one embodiment, facilitates network communications of the system or server 600 over a communications channel of a network, such as the network 102, shown in FIG. 1. In an embodiment, the memory 610 stores one or more applications or programs 612, such as, the attachment server or network server application or program 616. In one embodiment, as shown in FIG. 6, the server-side content publishing program or tool 620 which runs on the network or attachment server 600 comprises a logic unit that contains a plurality of modules that functionally execute the necessary steps of distributing or sharing content sent in an e-mail message. In an embodiment, shown in FIG. 6, the server-side content publishing tool or program 620 running on the attachment or network server 600 includes an attachment receiving module 622, a link module 624, a notification module 626, a storage module 628, an update module 630 and a communication module 632. The attachment receiving module 624 receives one or more file attachments removed from the e-mail message created by an e-mail sender and forwarded by the e-mail server 400. In an embodiment, the link module 624 publishes the file attachment as a link to the attachment server 600. Further, the notification module 626 sends a link to the file attachment published on the attachment or network server 600 to the e-mail server 400. The storage module 628 stores the file attachments(s) 612 forwarded by the e-mail server 400 in a local storage 602 within the attachment or network server 600. Further, the storage module 628 stores the link(s) 614 to the file attachments(s) 612 in a local storage 602 within the attachment or network server 600. Moreover, the update module 630 provides updates to the e-mail server 400 for the file attachments stored on the attachment server 600. The communication module 632 permits communication between the various modules of the server-side content publishing tool 620, memory 610, local storage 602 and with external computer systems, such as, the e-mail server computer system 400 (shown in FIG. 4), which is connected to a network as discussed herein above with respect to FIG. 1.

Figure 7:
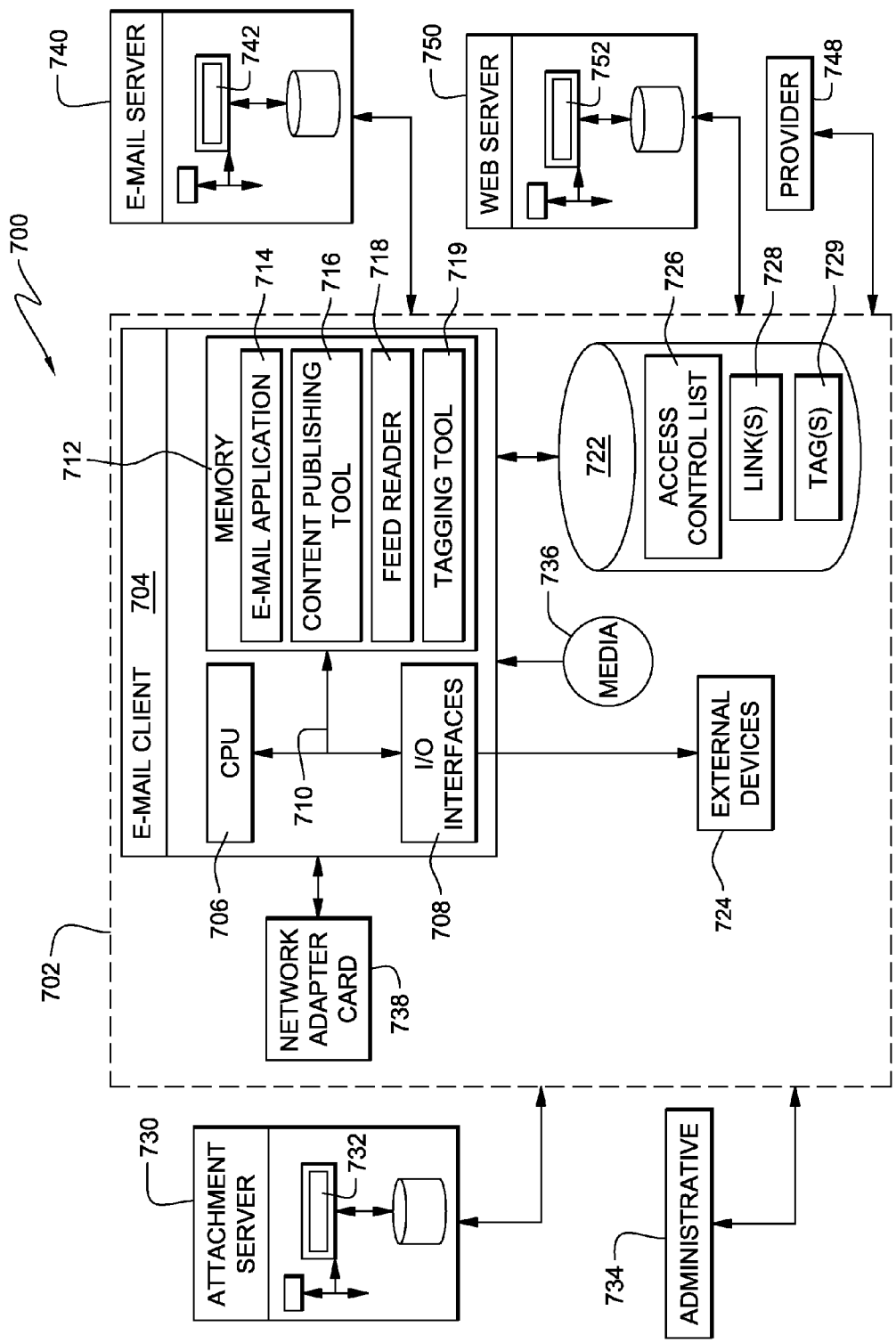
FIG. 7 is a schematic block diagram illustrating one embodiment of a computer infrastructure for distributing or publishing content contained in an e-mail message, including any file attachments intended for one or more recipients, in accordance with an embodiment of the present invention.

Reference is now made to FIG. 7, reference numeral 700, which schematically illustrates an embodiment of a computer infrastructure for distributing or sharing content, such as, an electronic mail (e-mail) message and/or one or more file attachments contained in an e-mail message created by a sender to one or more recipients connected on a computer network, in accordance with an embodiment of the invention. As shown in FIG. 7, the infrastructure 702 includes an e-mail client 704 that is remotely connected via a network (as shown in FIG. 1) to other computer systems or servers and is shown as having deployed there on a communication program or e-mail application program 714. In a preferred embodiment, the e-mail application 714 comprises a Web 2.0 e-mail application that includes Web 2.0 features or functions, such as, a tagging or bookmarking tool 719, which implements an embodiment of the invention for distributing or sharing content, such as, an electronic mail (e-mail) message and/or one or more file attachments contained in an e-mail message as feeds, in accordance with an embodiment of the invention. Further, the computer system 704 has deployed thereon a computer program product, namely, a content publishing or content sharing program or tool 716, which implements the invention for distributing or sharing content, such as, an electronic mail (e-mail) message and/or one or more file attachments contained in an e-mail message as feeds, in accordance with an embodiment of the present invention. In addition, the computer system 704 has installed in memory 712 a feed reader program 718 for reading and viewing one or more feeds. The computer program product comprises a computer readable or computer-usable storage medium, which provides program code namely, the content publishing or content sharing program or tool 716 and the tagging tool 719, for use by or in connection with a client computer system or any instruction execution system. The content publishing or content sharing tool 716 and/or the tagging tool 719 can be loaded into memory 712 of the client 704 from a computer readable storage medium or media, reference numeral 736, such as, a magnetic tape or disk, optical media, DVD, memory stick, semiconductor memory, etc. or downloaded from the server via a network adapter card (reference numerals 738), such as, a TCP/IP adapter card 738, installed on the computer system 704. As depicted in FIG. 7, computer system 700 includes a computer infrastructure 702, which is intended to represent any type of computer architecture that is maintained in a secure environment (i.e., for which access control is enforced). Further, as shown, infrastructure 702 includes an e-mail client 704 that typically represents an e-mail client computer system, such as, a laptop, a handheld device or the like that includes an e-mail application program or tool 714. It should be understood, however, that although not shown, other hardware and software components (e.g., additional computer systems, routers, firewalls, etc.) could be included in infrastructure 702.

In general, the e-mail client 704 is connected via a network to infrastructure 702. The e-mail client 704 includes an e-mail application program 714, a content publishing tool 716, a feed reader application or browser application 718 and a tagging tool 719 for distributing or sharing content, such as, the electronic mail (e-mail) message and/or one or more file attachments contained in the e-mail message created by a sender, which is addressed to one or more recipients. Further, as shown in FIG. 7, the e-mail client 704 can communicate with e-mail computer server or system 740 and/or with attachment computer server or system 730 and/or with web computer server or system 750 over a network, as discussed herein above with respect to FIG. 1. For instance, the e-mail client 704 queues the e-mail message created on the client for sending to the e-mail server system 740. The server-side content publishing tool 742 installed on e-mail server computer system 740 checks the e-mail message queued for any file attachments. If any file attachments are found the e-mail server removes the file attachments and sends the file attachments to the attachment server 730, which includes a server-side content publishing tool 732 for publishing the file attachments. In an embodiment, the attachment server 730 provides to the e-mail server 740 links to the file attachments stored thereon, as explained herein above with respect to FIGS. 4 and 9. Further, the server-side content publishing tool 742 installed on the e-mail server 740 posts the e-mail message without the file attachment as a feed on the web server or feed server 750, which has installed thereon a server-side content publishing tool 752, such that, the feed to the e-mail message can be accessed by the e-mail recipient, using an e-mail client. Referring to the e-mail client 704, in an embodiment, the content publishing tool 716 and the tagging tool 719 loaded into the local memory 712 of the e-mail client 704 from a computer readable storage medium or media, reference numeral 736, such as, a magnetic tape or disk, optical media, DVD, memory stick, semiconductor memory, etc. or downloaded from a server via a network adapter card (reference numerals 738) coupled to computer system 704, such as, a TCP/IP network card. It should be understood that under the present invention, infrastructure 702 could be owned and/or operated by a party such as provider 748, or by an independent entity. Regardless, use of infrastructure 702 and the teachings described herein could be offered to the parties on a subscription or fee-basis. Similarly, an administrator at a computer system or server 734 can access the system 700 to modify or alter access control to the system.

The client 704 is shown to include a CPU (hereinafter "processing unit 706"), a memory 712, a bus 710, and input/output (I/O) interfaces 708. Further, the client 704 is shown in communication with external I/O devices/resources 708 and storage system 722. In general, processing unit 706 executes computer program code stored in memory 712, such as, the e-mail application 714, the content publishing tool or program 716, the feed reader 718 and the tagging tool 719 for performing the steps of distributing or sharing content contained in an e-mail message created on e-mail client 704. In an embodiment, the one or more tag(s) or keywords 729 used to bookmark an e-mail message are stored in a local storage 722 within the client computer system 700. Further, in an embodiment, the link(s) 728 generated and sent by the e-mail server computer system 740 to the e-mail client 704 are stored in a local storage 722 within the client computer system 400. Although not pointed out in FIG. 7, the computer systems or servers 730 (attachment server), 734 (administrative system), 740 (e-mail server), 750 (web or feed server) and 748 (provider system) each include a CPU, a memory, a bus, input/output (I/O) interfaces, and storage, similar to computer system 704. In general, processing unit 706 executes computer program code stored in memory 712, such as, the content publishing tool 716 for distributing or sharing content created in an e-mail on the computer system 704, whereas, the processing unit of computer system 740 executes computer program code stored in a respective memory, such as, the server-side content publishing tool 742 for determining whether or not an e-mail received contains any file attachments. Similarly, the processing unit of computer system 750 executes computer program code stored in a respective memory, such as, the server-side content publishing tool 752 for posting e-mails, without the file attachments, as feeds on the computer system 750. Further, the processing unit of computer system 730 executes computer program code stored in a respective memory, such as, the server-side content publishing tool 732 for publishing the file attachments as links that can be accessed from the computer system 730. In an embodiment, an access control list 726 and any tag(s) 729 created by a sender using e-mail client 704 is stored in storage 722, whereas, any link(s) received from the e-mail server 740 are also stored in storage 722. While executing the content publishing tool or program 716 on the computer system 704, the processing unit 706 can read and/or write data, to/from memory 712, storage system 722, and/or I/O interfaces 708, such as, the tag(s) 729 stored in storage 722. Alternatively, the content publishing tool 716 may store the tag(s) 729 in memory 712. Bus 710 provides a communication link between each of the components in computer system 700, such that information can be communicated within the infrastructure 702. External devices 724 can comprise any devices (e.g., keyboard, pointing device, display, etc.) that enable a user to interact with computer system 700 and/or any devices (e.g., network card, modem, etc.) that enable e-mail client 704 to communicate with one or more other computing devices, such as, servers 730 and/or 740 and/or 750.

Computer infrastructure 702 is only illustrative of various types of computer infrastructures for implementing the invention. The computer system 700 is only representative of various possible computer systems that can include numerous combinations of hardware. To this extent, in other embodiments, computer system 700 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 706 may comprise a single processing unit, or be distributed across one or more processing units in one or more locations, e.g., on a client and server. Similarly, memory 712 and/or storage system 722 can comprise any combination of various types of data storage and/or transmission media that reside at one or more physical locations. Further, I/O interfaces 708 can comprise any system for exchanging information with one or more external devices 720. Still further, it is understood that one or more additional components (e.g., system software, math co-processing unit, etc.) not shown in FIG. 7 can be included in computer system 700.

Storage system 722 (as well as storage systems on servers 730, 740 and 750) can be any type of system (e.g., a database) capable of providing storage for information under the present invention. To this extent, storage system 722 could include one or more storage devices, such as, a magnetic disk drive or an optical disk drive. In another embodiment, system 722 includes data distributed across, for example, a local area network (LAN), wide area network (WAN) or a storage area network (SAN) (not shown). Although not shown, additional components, such as cache memory, communication systems, system software, etc., may be incorporated into computer system 700.

Figure 8:
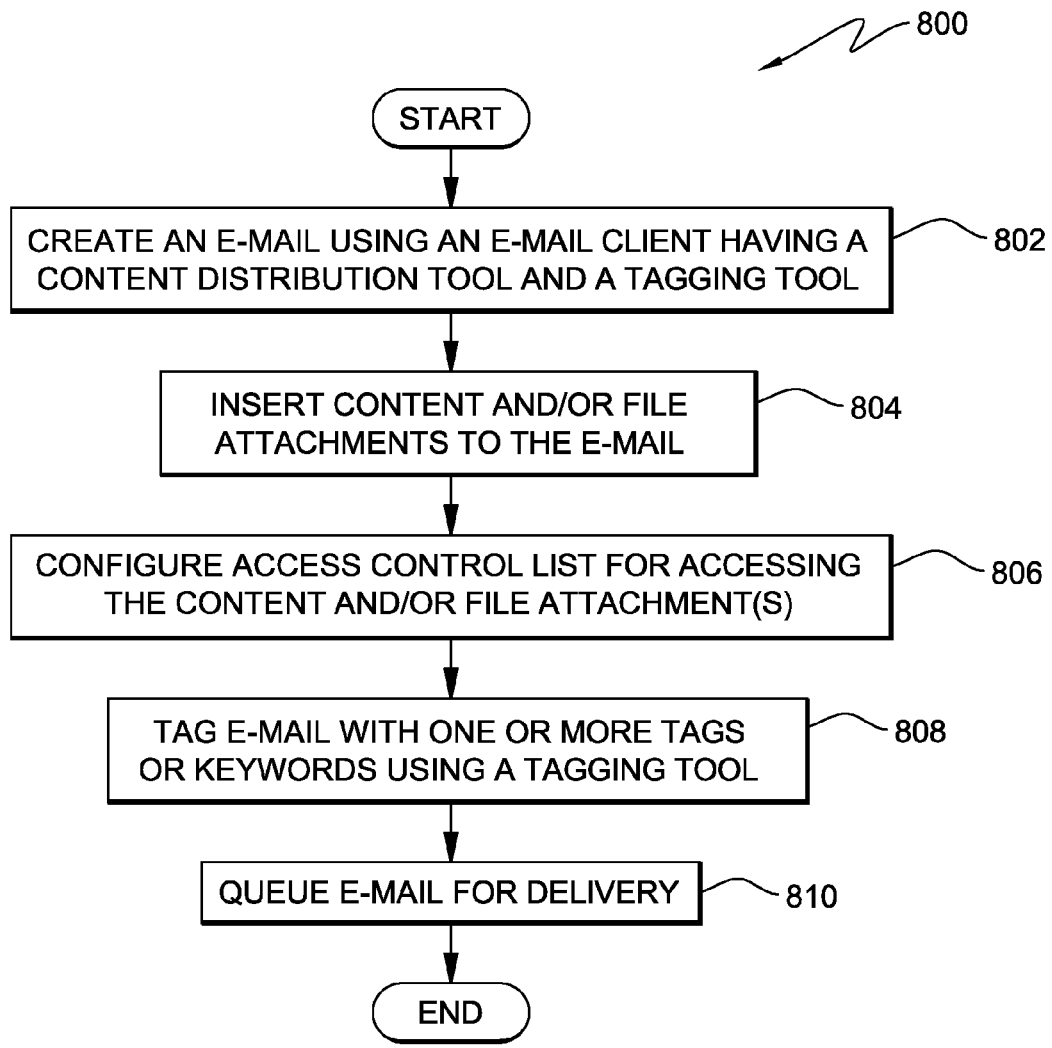
FIG. 8 depicts a flowchart outlining the steps performed by an e-mail client computer system having deployed thereon a content distribution tool for distributing or publishing content contained in an e-mail message, including any file attachments intended for one or more recipients, in accordance with an embodiment of the present invention.

In another embodiment, the invention provides a method or process for distributing or sharing content, such as, an electronic mail (e-mail) message and/or one or more file attachments contained in an e-mail message created by a sender to one or more recipients, in accordance with an embodiment of the invention. Reference is now made to FIGS. 8 through 11, which outline the steps performed by a content publishing tool deployed on each of the respective client-server systems for distributing or sharing contents of an e-mail. Turning to FIG. 8, reference numeral 800, outlines the steps performed by a client computer system (as described herein above with respect to FIG. 3) that has an e-mail client application installed thereon along with a content publishing or distribution tool and a tagging tool for distributing or sharing content contained in an e-mail. As shown in FIG. 8, in step 802, an e-mail client application having a content distribution or publishing tool and a tagging tool is used to create an e-mail. The e-mail application is used to insert in step 804 any content and/or file attachment(s) selected by a user. Further, the content publishing or distribution tool is used to configure in step 806 an access control list that provides varying degrees of access to the content and/or file attachments inserted in the e-mail created by the user. Furthermore, the tagging tool of the e-mail client application is used to tag in step 808 the e-mail created with one or more tags or keywords, such that, the tag can be used to locate the particular e-mail more easily. In step 810, the e-mail client application queues the e-mail for delivery, ending the process.

Figure 9:
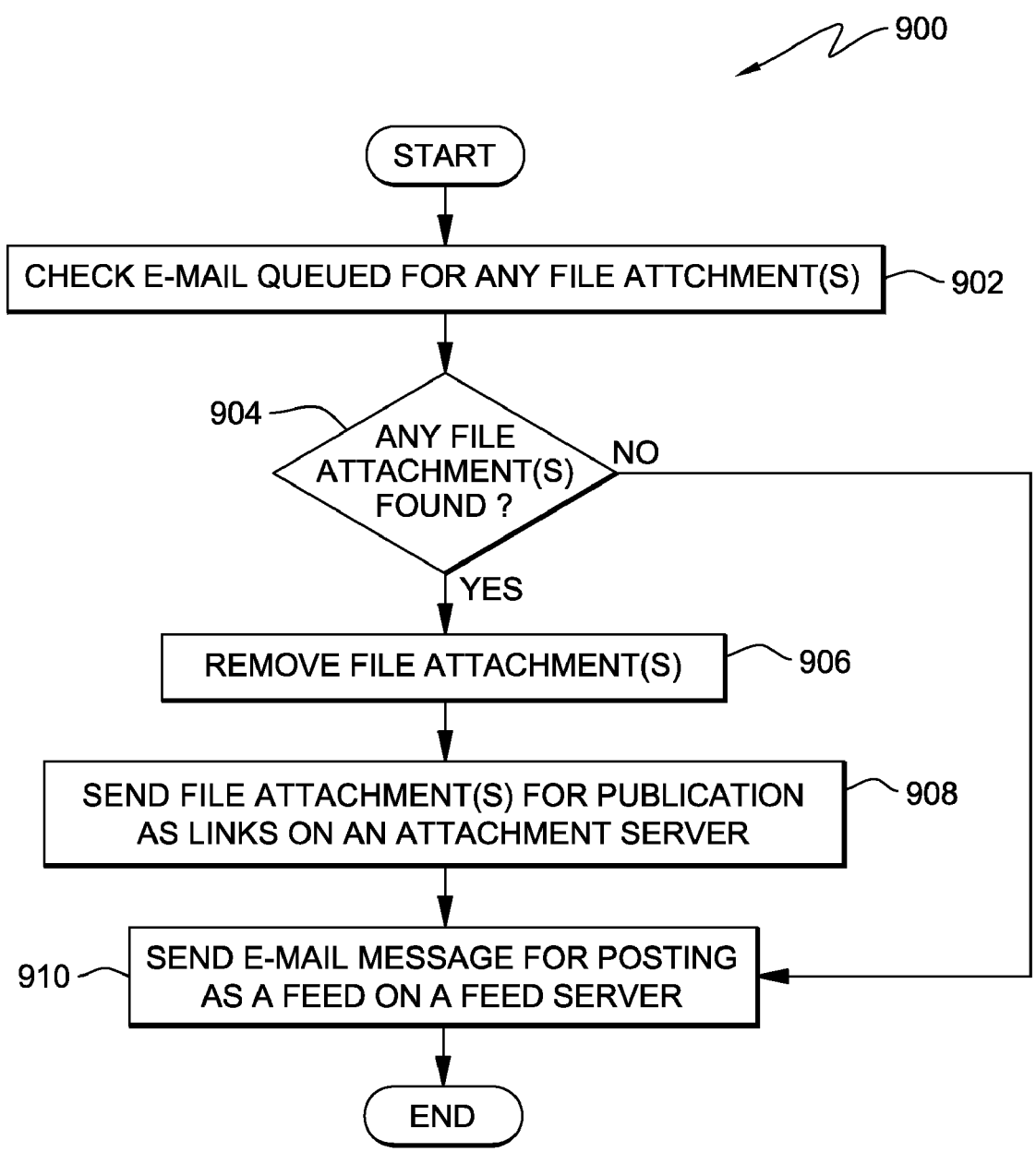
FIG. 9 depicts a flowchart outlining the steps performed by an e-mail server computer system having deployed thereon a content distribution tool for distributing or publishing content contained in an e-mail message, including any file attachments intended for one or more recipients, in accordance with an embodiment of the present invention.

Reference is now made to FIG. 9, reference numeral 900, which outlines the steps performed by an e-mail server computer system (as described herein above with respect to FIG. 4) that has an e-mail server application installed thereon along with a content publishing or distribution tool for distributing or sharing content contained in an e-mail. As shown in FIG. 9, in step 902, an e-mail server application having a content distribution or publishing tool is used to check whether or not the e-mail queued for delivery contains any file attachments. In step 904, the content publishing tool installed on the e-mail server determines whether or not any file attachments are found in the e-mail. If the content publishing tool finds any file attachments, the content publishing tool removes in step 906 any file attachments from the e-mail. Further, the content publishing or distribution tool sends in step 908 the file attachments to an attachment server for publication of the file attachments on the attachment server, as links. Furthermore, the content publishing tool sends in step 910 the e-mail message without the file attachment to a feed server for posting the e-mail message as a feed on a web server or feed server. However, going back to step 904, if the content publishing tool on the e-mail server does not find any file attachments, then the process continues with step 910, where the content publishing tool sends in step 910 the e-mail message to a feed server for posting the e-mail message as a feed on a web server or feed server, ending the process.

Figure 10:
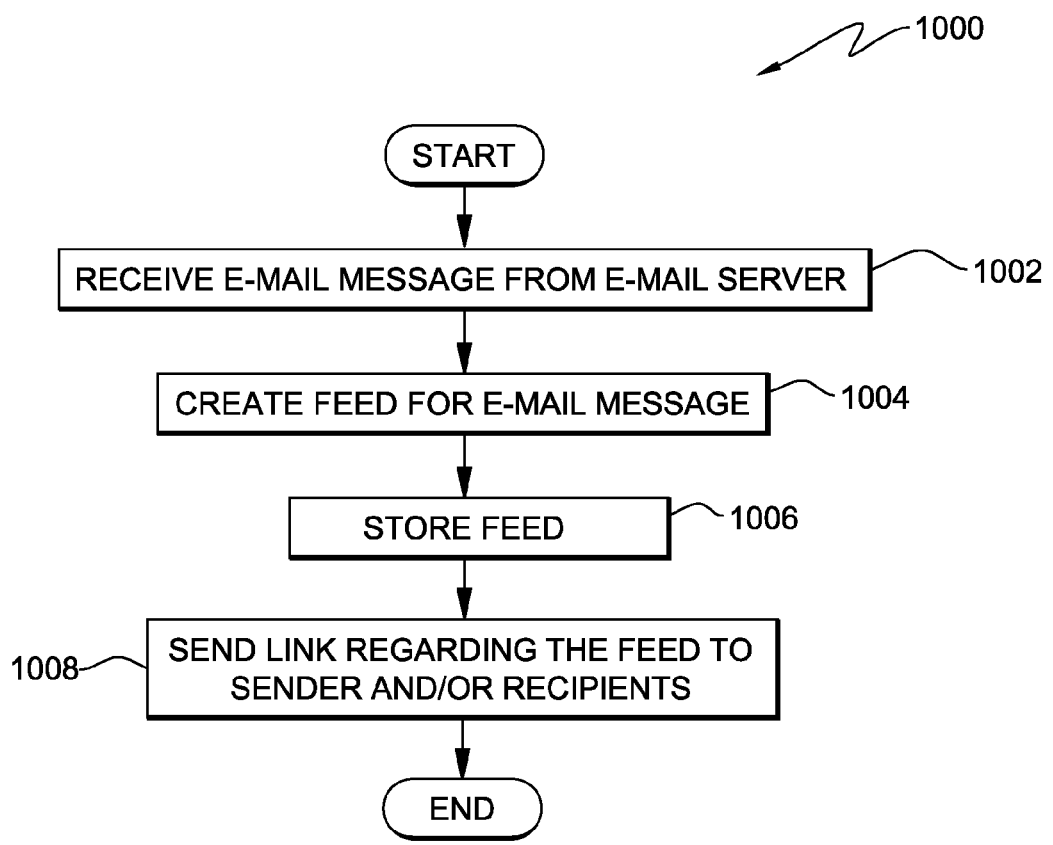
FIG. 10 depicts a flowchart outlining the steps performed by a web server or feed server computer system having deployed thereon a content distribution tool for distributing or publishing content contained in an e-mail message, including any file attachments intended for one or more recipients, in accordance with an embodiment of the present invention.

Reference is now made to FIG. 10, reference numeral 1000, which outlines the steps performed by a web server computer system (as described herein above with respect to FIG. 5) that has a web application and a feed server application installed thereon for distributing or sharing content contained in an e-mail, in accordance with an embodiment of the invention. In step 1002, the web or feed server computer system receives the e-mail message from the e-mail server, where the e-mail message does not contain any file attachments. The web server having the feed server application creates a feed for the e-mail message in step 1004. Further, the web server stores the feed in a local storage within the server 500. Furthermore, the web server sends a link regarding the feed to the sender and/or recipients for whom the e-mail message was intended, ending the process.

Figure 11:
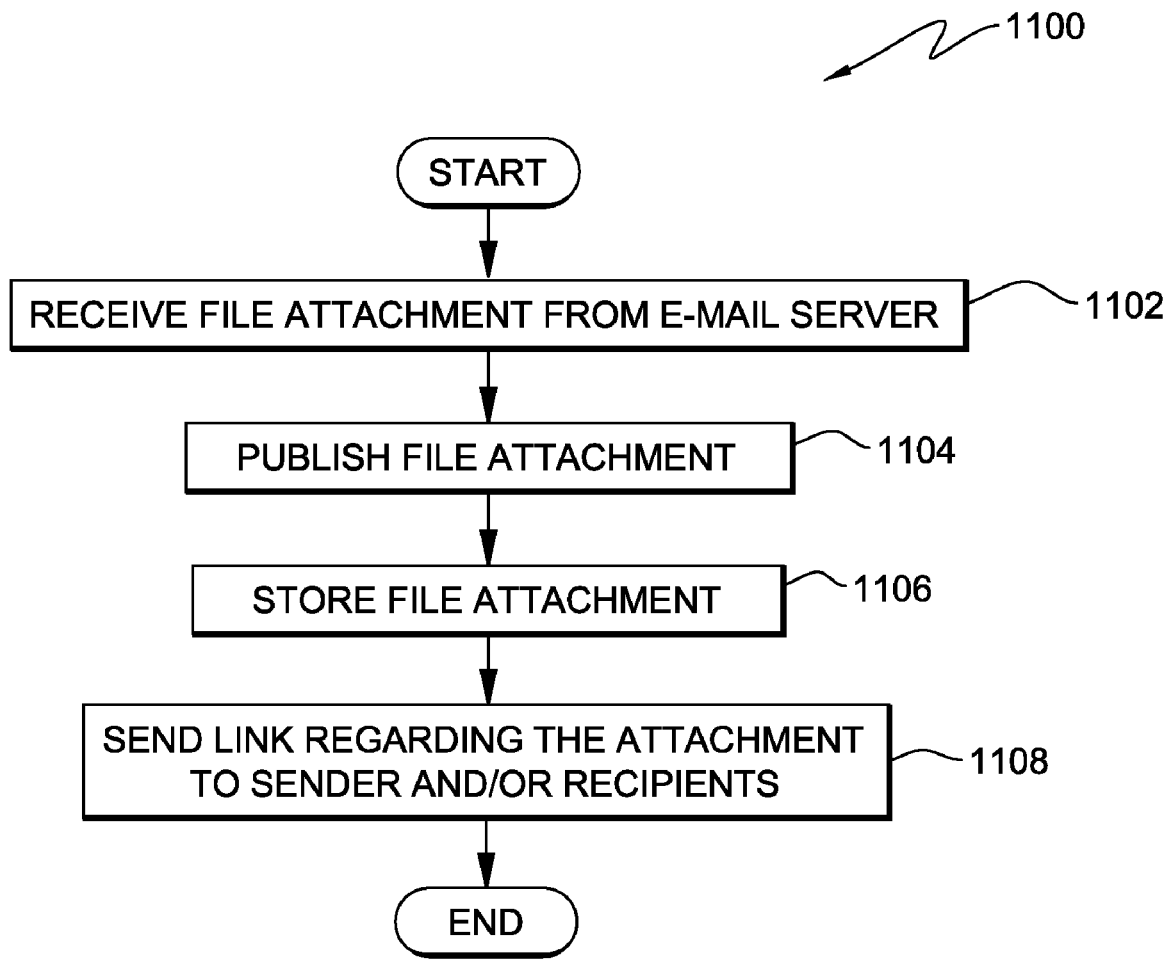
FIG. 11 depicts a flowchart outlining the steps performed by an attachment server or network server computer system having deployed thereon a content distribution tool for distributing or publishing content contained in an e-mail message, including any file attachments intended for one or more recipients, in accordance with an embodiment of the present invention.

Reference is now made to FIG. 11, reference numeral 1100, which outlines the steps performed by an attachment or network server computer system (as described herein above with respect to FIG. 6) that has an attachment server or network server application or software installed thereon for distributing or sharing content contained in an e-mail, in accordance with an embodiment of the invention. In step 1102, the attachment or network server computer system receives the file attachment removed from the e-mail message by the e-mail server. The attachment server publishes a link to the file attachment in step 1104. Further, in step 1106, the attachment server stores the file attachment in a local storage within the attachment server 600. Furthermore, in step 1108, the attachment server sends a link regarding the file attachment to the sender and/or recipients for whom the e-mail message was intended, ending the process.

Figure 12:
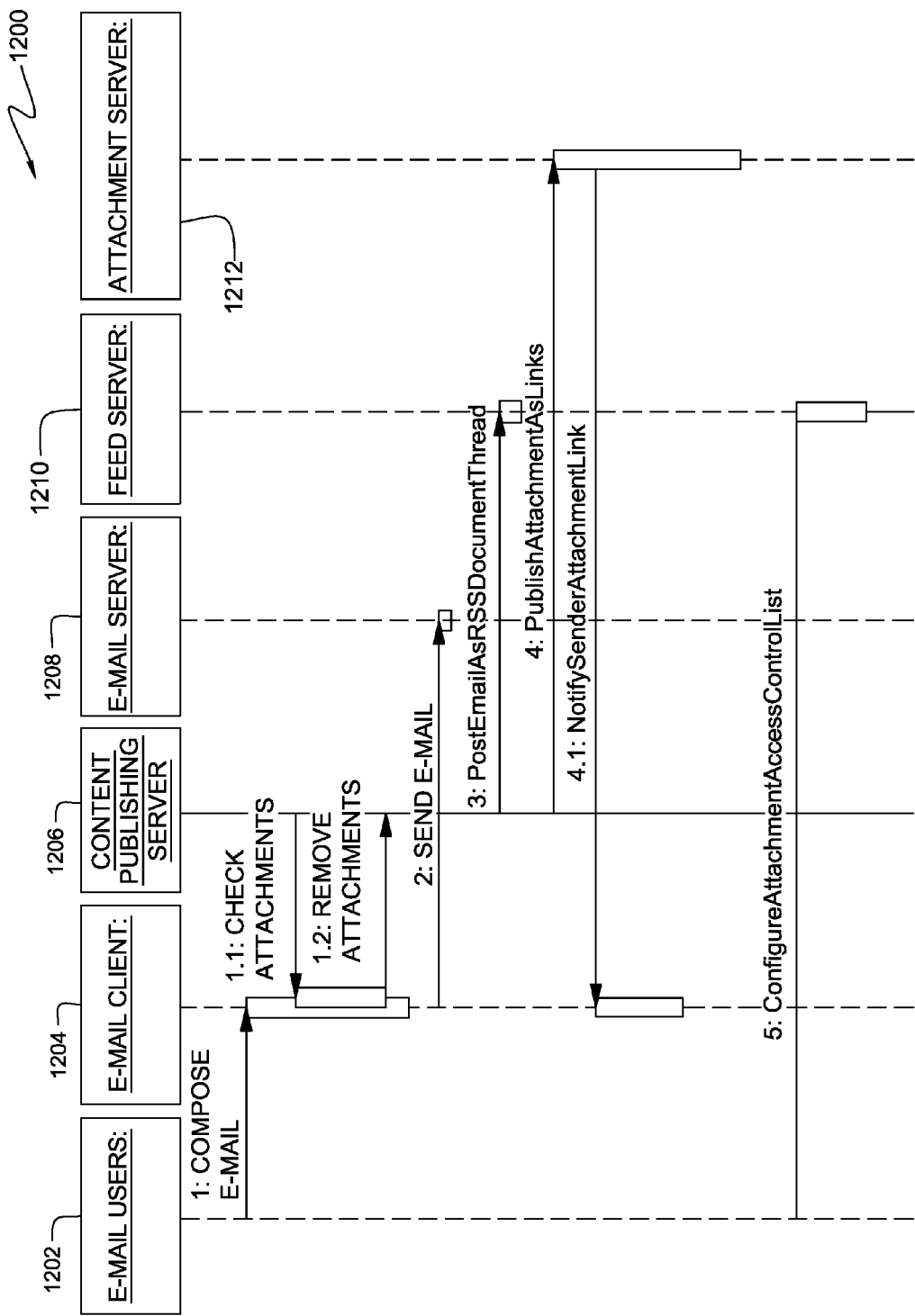
FIG. 12 is an illustration of an embodiment of a cloud computing network for distributing or publishing content contained in an e-mail message, in accordance with an embodiment of the present invention.

In another embodiment, shown in FIG. 12, reference numeral 1200, the content publishing tool is deployed on a server, for instance, a service provider server connected to a network cloud (shown in FIG. 1), so that the content publishing tool is provided as a service to multiple parties using the network. An e-mail user 1202 composes an e-mail using an e-mail client 1204. The user inserts any file attachments and configures an access control list specifying one or more levels of access for recipients of the e-mail and hits the "send" button. The content publishing tool server 1206 checks the e-mail message for file attachments and if file attachments are found, the content publishing tool server 1206 removes the file attachments and sends the e-mail message without the file attachments to the e-mail server. Further, the content publishing tool server 1206 posts the e-mail message as a feed thread or a RSS document thread on the feed or RSS server 1210 and publishes file attachments as links on the attachment server 1212. Further, the attachment server 1212 notifies the sender of the link to the file attachments.

Figure 13:
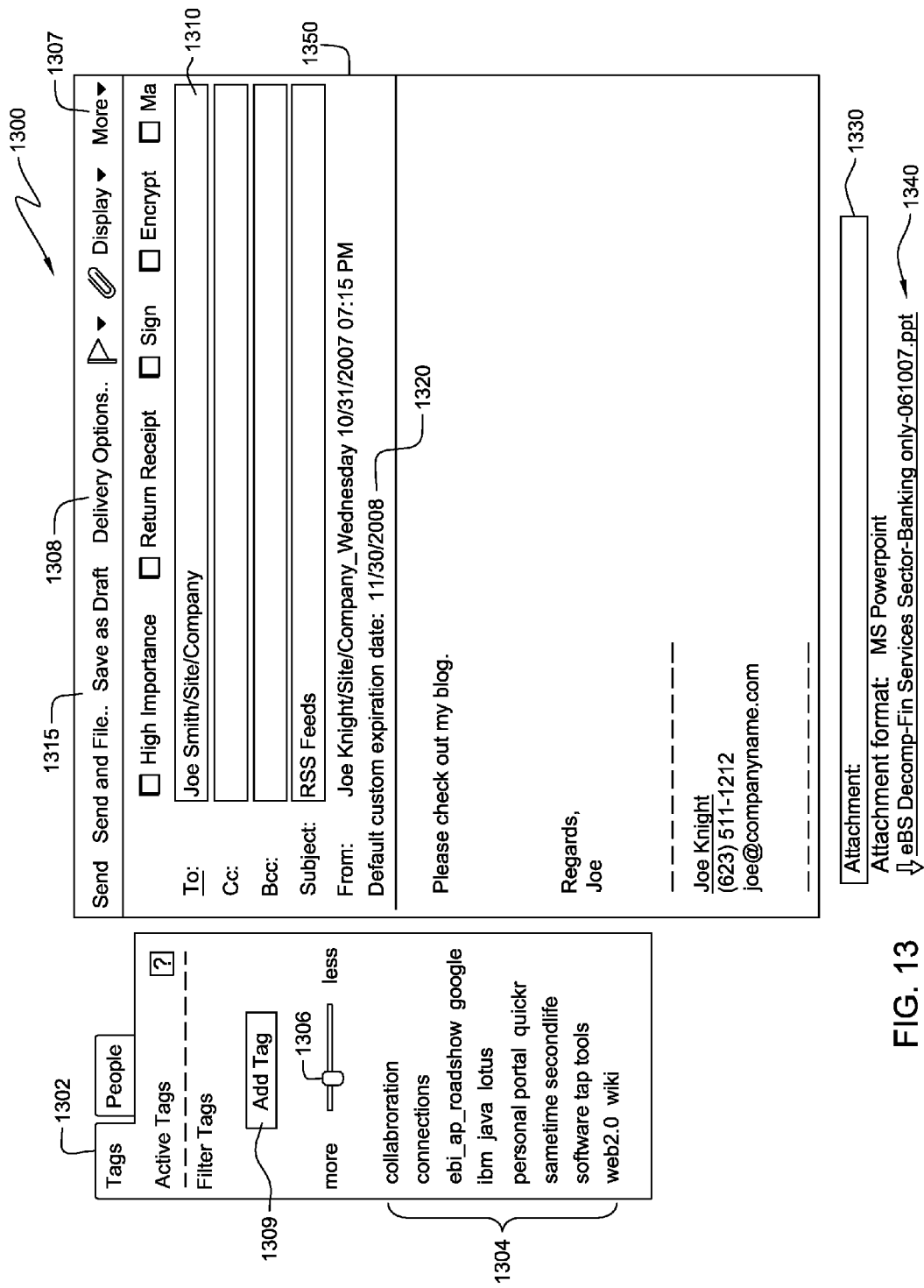
FIG. 13 is an illustration of an e-mail message created in an e-mail window or screen in an e-mail application having a content publishing tool and a tagging tool for distributing or publishing content contained in an e-mail message, in accordance with an embodiment of the present invention.
Figure 14:
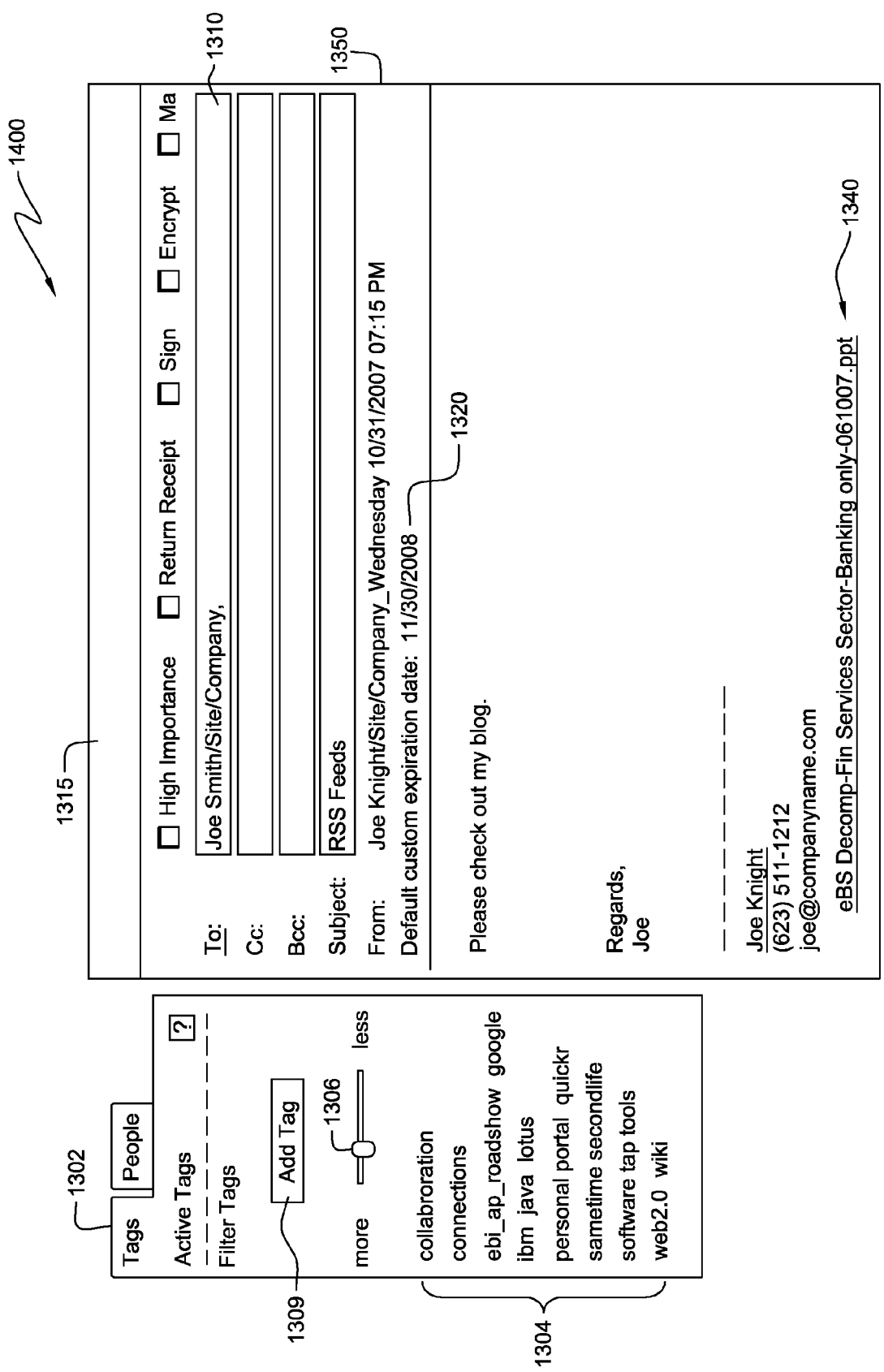
FIG. 14 is an illustration of an e-mail message received in an e-mail window or screen in an e-mail application having a content publishing tool and a tagging tool for distributing or publishing content contained in an e-mail message, in accordance with an embodiment of the present invention.

Reference is now made to FIGS. 13 and 14, which depict examples of an e-mail window with FIG. 13 showing an example of an e-mail message created by a creator or sender on an e-mail client having installed thereon a content publishing tool and a tagging tool and with FIG. 14 showing an example of an e-mail message received by a recipient having an e-mail client having installed thereon content publishing tool and a tagging tool Turning to FIG. 13, reference numeral 1300, depicts an example of an e-mail window showing an e-mail message 1350 posted as a feed that is received by a recipient having an e-mail client that has a content publishing tool and a tagging tool, in accordance with an embodiment of the invention. In particular, a recipient ("Joe Smith") receives a feed to an e-mail message posted on a web server or feed server in a feed folder or inbox folder. The recipient clicks on the feed or inbox folder and is shown the e-mail message 1200 in FIG. 13. As shown in FIG. 13, the e-mail is addressed to a "Joe Smith" (in the To recipient group 1310). It is understood that additional recipients can be specified in either the cc recipient group and/or the bcc recipient group. Alternatively, the sender can specify recipients that are individuals or specify recipients that are groups, where a group is made of two or more individuals. The e-mail window 1300 further shows an "attachments" bar 1330 at the bottom of the window 1300, which includes one or more links to file attachments intended for the recipient. In particular, the e-mail shows a link 1340 to a file attachment that the recipient can click on in order to access the file attachment. Further, the e-mail window 1350 shows a "default custom expiration date" field (reference numeral 1320) that contains the expiration date of "11/30/2008". This indicates to the recipient that the link 1340 to the file attachment will expire on this particular date, such that, the file attachment can no longer be accessed by the recipient. Furthermore, to the left of the e-mail window, is a tags tab or window 1302 that lists one or more tags or keywords 1304 that have been previously used by the recipient. The user can choose to tag the e-mail message with any of the tags 1304 displayed in the tags tab 1302. For instance, the user can select a new tag from the list of tags 1304 by sliding the slide (reference numeral 1306) towards "More" to show more tags in the tags window 1301. Alternatively, the tags tab 1302 allows a user to select or click on the "Add tag" button or widget 1309 for creating a new tag. It will be understood that other suitable alternatives can be provided to create a new tag for the e-mail message created. Further, in an embodiment, the sender or creator of the e-mail message can select a specific date of delivery for sending the e-mail message to the recipient by selecting an option under the Delivery Options pull down menu 1308 in the main menu 1315 at the top of the e-mail window 1300. As such, the creator can un-send the e-mail before the date of delivery that has been selected. Further, the creator of the e-mail message can configure an access control list accessed via the "More" sub-menu in the main menu 1315 for controlling access to the e-mail message and/or file attachments by the recipient, Joe Smith, identified in the e-mail. For instance, the recipient may be given only viewing or reading privileges, such that, the recipient Joe may not edit the e-mail message and/or any file attachments. Similarly, the recipient Joe may be given editing privileges, such that, the recipient may edit the e-mail message and/or any file attachments. Moreover, the recipient Joe may be given administrative privileges, such that, the recipient may not only edit the e-mail message and/or any file attachments, but may delete the e-mail message and/or any file attachments. In an embodiment, the access control list generated by the creator is stored in a local storage within the e-mail client computer system.

Turning to FIG. 14, reference numeral 1400, depicts an example of an e-mail window showing an e-mail message 1350 that is received by a recipient having an e-mail client that has deployed thereon a content publishing tool and a tagging tool, in accordance with an embodiment of the invention. In an embodiment, the e-mail client includes a "feed" or inbox folder, which contains feeds corresponding to one or more e-mail messages posted on a web server or feed server. In particular, the recipient ("Joe Smith") receives the feed to an e-mail message posted on a web server or feed server in the feed folder. The recipient clicks on the feed folder and is shown one or more different e-mail messages posted as feeds, including feed 1400. The recipient, Joe Smith, clicks on the feed and is taken to the e-mail message 1400 shown in FIG. 14. In particular, in this example, the feed depicts the e-mail message 1400 in FIG. 14. The e-mail message 1450 is similar to the e-mail message created by the sender in FIG. 14. However, the received e-mail message does not contain main menu options 1315 at the top of the composition window, as shown in FIG. 14. Instead, the e-mail window 1400 shows the e-mail message created in FIG. 14 and shows the file attachments published as links. In particular, the file attachment 1340 is shown as a link within the body of the e-mail message, at the very end, such that, the recipient can click on the link to access the file attachment. Again, if the expiration date 1320 has expired, then the recipient will be unable to access the document. Further, the recipient can choose to tag the e-mail message received with any of the tags 1304 displayed in the tags tab 1302 or the recipient can create a new tag, for instance, by selecting an option for selecting a new tag by sliding the slide shown in reference numeral 1306 towards "More" to show more tags in the window 1304. Alternatively, the tags tab 1302 allows a recipient to select an option "Add tag" by clicking or selecting the button or widget 1309 for creating a new tag. It will be understood that other suitable alternatives can be provided to create a new tag for the e-mail message received. Further, based on the access control provided by the creator of the e-mail message 1400 received, the recipient Joe may be given only viewing/reading privileges or may be given editing privileges or may be given administrative privileges, such that, the recipient may not only edit the e-mail message and/or any file attachments, but may delete the e-mail message and/or any file attachments.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for distributing an e-mail and a file attachment, the method comprising the steps of:
  a computer receiving an e-mail with a file attachment, and in response,
    the computer removing the file attachment from the e-mail,
    the computer sending the e-mail to a feed server on a network and requesting the feed server to post the e-mail as a feed document to make the e-mail available for access by an e-mail recipient via a first link, and
    the computer sending the attachment to an attachment server on a network to make the file attachment available for access by the e-mail recipient via a second link.

2. The method of claim 1, further comprising the steps of:
  a computer sending, to one or more recipients specified in the e-mail as recipients of the e-mail, the first link to the e-mail available for access from the feed server, such that the one or more recipients can access the e-mail by selecting the first link for the e-mail; and
  a computer sending, to the one or more recipients specified in the e-mail as recipients of the e-mail, the second link to the file attachment available for access from the attachment server, such that the one or more recipients can access the second file attachment by selecting the link for the file attachment.

3. The method of claim 1, wherein the computer received the e-mail and the file attachment from a user workstation, a user at the workstation composed the e-mail and attached the file attachment to the e-mail.

4. The method of claim 1, wherein the e-mail includes one or more tags, and the feed server combines the one or more tags with the e-mail for display.

5. The method of claim 1 wherein the first link for accessing the e-mail is listed in a feed folder, and the second link for accessing the attachment is displayed with the e-mail after the e-mail is accessed via the first link for accessing the e-mail.

6. A computer program product comprising a computer-readable, tangible storage device and computer-readable program instructions stored on the computer-readable, tangible storage device to distribute an e-mail and a file attachment, the computer-readable program instructions, when executed by a CPU:
  receive an e-mail with a file attachment, and in response,
    remove the file attachment from the e-mail,
    send the e-mail to a feed server on a network and request the feed server to post the e-mail as a feed document to make the e-mail available for access by an e-mail recipient via a first link, and
    send the attachment to an attachment server on a network to make the file attachment available for access by the e-mail recipient via a second link.

7. The computer program product of claim 6, wherein the computer-readable program instructions, when executed by a CPU:
  send to one or more recipients specified in the e-mail as recipients of the e-mail the first link to the e-mail available for access from the feed server, such that the one or more recipients can access the e-mail by selecting the first link for the e-mail; and
  send to the one or more recipients specified in the e-mail as recipients of the e-mail the second link to the file attachment available for access from the attachment server, such that the one or more recipients can access the file attachment by selecting the second link for the file attachment.

8. The computer program product of claim 6, wherein the computer-readable program instructions received the e-mail and the file attachment from a user workstation, a user at the workstation composed the e-mail and attached the file attachment to the e-mail.

9. The computer program product of claim 6, wherein the e-mail includes one or more tags, and the feed server combines the one or more tags with the e-mail for display.

10. The computer program product of claim 6 wherein the first link for accessing the e-mail is listed in a feed folder, and the second link for accessing the attachment is displayed with the e-mail after the e-mail is accessed via the first link for accessing the e-mail.

11. A computer system for distributing an e-mail and a file attachment, the computer system comprising:
  a CPU, a computer-readable, tangible storage device and a computer-readable memory;
  program instructions to receive an e-mail with a file attachment, and in response,
    the program instructions remove the file attachment from the e-mail,
    the program instructions send the e-mail to a feed server on a network and request the feed server to post the e-mail as a feed document to make the e-mail available for access by an e-mail recipient via a first link, and
    the program instructions send the attachment to an attachment server on a network to make the file attachment available for access by the e-mail recipient via a second link; and wherein
  the program instructions are stored on the computer-readable, tangible storage device for execution by the CPU via the computer-readable memory.

12. The computer system of claim 11, further comprising:
  program instructions, stored on the computer-readable, tangible storage device for execution by the CPU via the computer-readable memory, to send to one or more recipients specified in the e-mail as recipients of the e-mail the first link to the e-mail available for access from the feed server, such that the one or more recipients can access the e-mail by selecting the first link for the e-mail; and
  program instructions, stored on the computer-readable, tangible storage device for execution by the CPU via the computer-readable memory, to send to the one or more recipients specified in the e-mail as recipients of the e-mail the second link to the file attachment available for access from the attachment server, such that the one or more recipients can access the file attachment by selecting the second link for the file attachment.

13. The computer system of claim 11, wherein the program instructions that received the e-mail and the file attachment received the e-mail and the file attachment from a user workstation, a user at the workstation composed the e-mail and attached the file attachment to the e-mail.

14. The computer system of claim 11, wherein the e-mail includes one or more tags, and the feed server combines the one or more tags with the e-mail for display.

15. The computer system of claim 11 wherein the first link for accessing the e-mail is listed in a feed folder, and the second link for accessing the attachment is displayed with the e-mail after the e-mail is accessed via the first link for accessing the e-mail.

\* \* \* \* \*